US008675038B2

(12) United States Patent
Wessling (10) Patent No.: US 8,675,038 B2
(45) Date of Patent: Mar. 18, 2014

(54) TWO-WAY VIDEO CONFERENCING SYSTEM

(75) Inventor: Cynthia Wessling, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 319 days.

(21) Appl. No.: 12/892,650

(22) Filed: Sep. 28, 2010

(65) Prior Publication Data

US 2012/0075407 A1 Mar. 29, 2012

(51) Int. Cl.
H04N 7/14 (2006.01)

(52) U.S. Cl.
USPC ........................................................ 348/14.01

(58) Field of Classification Search
USPC ........................................ 348/14.01–14.09
See application file for complete search history.

(56) References Cited

U.S. PATENT DOCUMENTS

| | | | | |
|---|---|---|---|---|
| 5,159,445 A * | 10/1992 | Gitlin et al. | ............... | 348/14.01 |
| 5,872,923 A | 2/1999 | Schwartz | | |
| 5,963,247 A * | 10/1999 | Banitt | ........................... | 348/121 |
| 7,515,174 B1 | 4/2009 | Francisco et al. | ........... | 348/14.16 |
| 7,746,373 B2 * | 6/2010 | Martini | ....................... | 348/14.01 |
| 2004/0001137 A1 | 1/2004 | Cutler et al. | ............... | 348/14.08 |
| 2004/0008423 A1 | 1/2004 | Driscoll et al. | ................ | 359/725 |
| 2007/0299912 A1 | 12/2007 | Sharma et al. | ................ | 709/204 |
| 2008/0237412 A1* | 10/2008 | Chinuki et al. | ............ | 248/123.2 |
| 2008/0266380 A1 | 10/2008 | Gorzynski et al. | ......... | 348/14.08 |
| 2008/0316297 A1 | 12/2008 | King et al. | ................. | 348/14.09 |
| 2009/0147070 A1 | 6/2009 | Marathe et al. | ............ | 348/14.09 |
| 2010/0085416 A1 | 4/2010 | Hegde et al. | ............... | 348/14.08 |
| 2010/0118112 A1 | 5/2010 | Nimri et al. | ................ | 348/14.08 |
| 2010/0153497 A1* | 6/2010 | Sylvain et al. | ................ | 709/204 |
| 2011/0018960 A1* | 1/2011 | Eshkoli et al. | ............. | 348/14.09 |

FOREIGN PATENT DOCUMENTS

| | | |
|---|---|---|
| WO | WO2004/112290 | 12/2004 |
| WO | WO2010/033036 | 3/2010 |

OTHER PUBLICATIONS

Joerg-Hauber, et al.; "Spatial Video Conferencing"; HIT Lab NZ; Sep. 2004; accessed Jul. 13, 2010 at http://www.hitlabnz.org/wiki/Spatial_Video-Conferencing; 5 pgs.
"Microsoft RoundTable"—Retrieved Date: Jul. 14, 2010 at http://download.microsoft.com/download/7/8/f/78f7baf8-f80a-4d87-8edb-236bc3977617/Microsoft%20RoundTable%20Datasheet.pdf; 2 pgs.
"Polycom® CX5000"; Retrieved Date: Jul. 14, 2010 at http://www.polycom.com/products/voice/conferencing_solutions/microsoft_optimized_conferencing/cx5000.html; 2 pgs.
International Search Report mailed Mar. 23, 2012, issued in PCT/US2011/048274.

* cited by examiner

*Primary Examiner* — Maria El-Zoobi
(74) *Attorney, Agent, or Firm* — Jim Ross; Peter Taylor; Micky Minhas (57) ABSTRACT

A video conferencing device that includes a camera and display system captures video of local participants and displays incoming video feeds from remote locations. For example, incoming video feeds of the remote participants may be displayed on an outward-facing circular screen mounted on a central pedestal. One or more cameras are also mounted on the pedestal in order to capture video of the local participants. The incoming video feed can be arranged or organized in various ways on the display based in part on the quantity of incoming feeds and/or the needs of the conference-room participants.

20 Claims, 5 Drawing Sheets

TWO-WAY VIDEO CONFERENCING SYSTEM

BACKGROUND

Video conferencing has become more popular in recent years. Various video conferencing camera systems have been developed for this purpose. In many video conferencing scenarios, an omni-directional camera is placed in the middle of a conference room table. This camera captures video images of the meeting participants sitting around the table which are then transmitted to one or more remote sites or saved for later play back of the meeting for those unable to attend. The participants in the video conference often view the incoming video from the remote sites on a display or a screen mounted on a wall of the video conference room.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

A video conferencing system captures video of local participants and displays incoming video feeds from remote locations on the same video conferencing device. For example, incoming video feeds of the remote participants may be displayed on an outward-facing cylindrical display that is mounted on a central pedestal. One or more cameras are also mounted on the pedestal in order to capture video of the local participants. The incoming video feed can be arranged or organized and displayed in various ways on the cylindrical display based on the incoming feeds and/or the settings of the video conference.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process.

Figure 1:
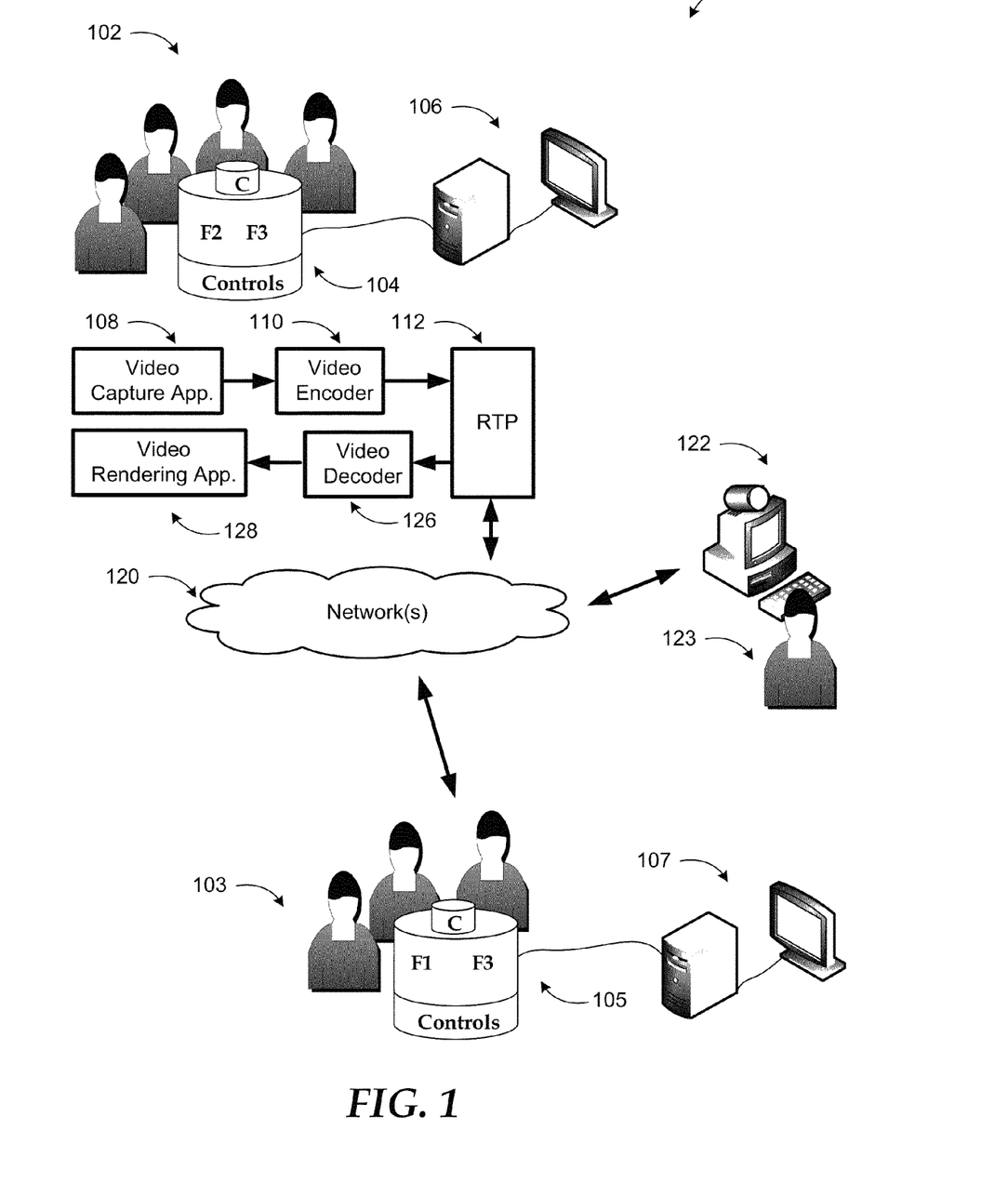
FIG. 1 illustrates a video conference system.

Referring to FIG. 1, video conference system 100 is illustrated. With the proliferation of Internet-based communication tools and applications, video applications that provide video communication over private or public networks have grown in number and variety. Such applications may be applications residing on computing devices (e.g. 106, 107, 122) or hosted applications executed by a service and used by a device/application remotely. In any case, video images are captured by a camera device and may be shown on a display.

Video conferencing systems allow for meetings to occur with visual interaction despite the fact that meeting participants may be located in different geographic locations. The visual aspect of video conferencing makes it typically more appealing than telephone conferences, while at the same time being a lower-cost alternative to (and typically can occur on shorter notice than) in-person meetings when one or more participants must travel to the meeting location. Some video conferencing systems use automated detection techniques or presets to move the camera (e.g., pan or tilt the camera) for focusing on specific regions or people if multiple people are participating in one location.

Many tabletop videoconferencing devices separate the location of the camera that captures video of the local participants from the display of incoming video feeds from remote participants so that the people seated around the device (e.g. 102, 103) must look in a different direction from the camera in order to see the display of incoming video. This disrupts the simulation of face-to-face interaction. For example, a camera/telephone device sits in the center of a conference-room table and is taking video of the people and activity around the table while the display of the video feed of remote participants is projected onto a wall. As a result, the people around the conference table are looking away from the camera in order to see the video display of the remote participants. From the remote participant's perspective, people in the conference rooms that are participating in the video conference are looking away.

To help in providing a more face-to-face feel to a meeting, a two-way video conferencing device, such as devices 104 and 105 in FIG. 1 captures video of local participants and displays incoming video feeds of participants from remote locations on the video conferencing device. Incoming video feeds from the remote participants are displayed on a cylindrical display that is mounted on a central pedestal. One or more cameras are also mounted on the pedestal in order to capture video of the local participants. In this way, from the remote participants' perspective, the participants of the video conference appear to be looking at the remote participants while the participants of the video conference are looking at the incoming video feeds of the remote participants.

In FIG. 1, computing device 106 and computer device 107 represent a computer (e.g. a server) connected to incoming/outgoing sources for the video feeds. Conferencing devices (104 and 105) include one or more cameras for capturing local participants and a display that is incorporated with the camera for displaying video feeds. For example, conferencing device 104 may capture local participants 102 and display incoming video feeds (F2, F3) captured by conferencing device 105 of remote participants 103 and device 122 including remote participant 123.

The camera system may be designed many different ways. For example, the camera system may be designed to capture a 360 degree view of the conference room. One or more cameras may be included in conferencing devices (104, 105). According to one embodiment, conferencing device 104 and 105 are tabletop devices that include one or more cameras for capturing video images of the participants sitting around a conference table and a cylindrical display to display incoming video feeds from remote locations. Generally, the camera is mounted on the conferencing device near the cylindrical display of the incoming video feeds. According to one embodiment, the conferencing device includes a pedestal for holding the camera and display and controls that includes a height adjustment in order to place the camera and displays at an appropriate level. Alternatively, the pedestal is a fixed height. According to one embodiment, the display on conferencing devices 104 and 105 is a cylindrical display that displays the incoming feeds (e.g. feeds F1, F2, and F3) on the same structure that also includes the camera(s) for capturing the outgoing video feeds. The display includes a display surface for displaying video images around the cylinder.

The camera (C) may be mounted above the display or in some other location in/on the camera system 105. For example, the cameras may be mounted within the display such that the camera and the display are at the approximately same level. The camera(s) may also be integrated on the surface of the display and/or slightly offset from the surface. For example, if the cylindrical display is designed to automatically rotate, the camera(s) may be mounted on a structure that does not move relative to the rotating cylindrical display. Generally, the camera system (e.g. 104, 105) is designed such that the participants of the conference may look directly at the video conferencing camera and see the incoming feeds from the other remote locations.

A typical video communication begins at computing device 106 with a video capture application 108, which captures frames of video through a conferencing device (e.g. conference device 104). The video signal may first be passed through one or more processing blocks for filtering, backlighting adjustments, and the like. The processed video signal is encoded in video encoder 110 for transmission over a network and provided to Real Time Protocol (RTP) block 112 for formatting the signal to be transported over the network. Any one of a number of network transportation protocols may be employed to transmit the signal to a receiving device (e.g. computing device 122). Network(s) 120 may include private or public networks such as the Internet, or a combination of the two.

Incoming video signals from remote sites are received by RTP block 112 at the receiving device and translated. Video decoder 126 decodes the signal and provides the decoded signal to rendering application 128, which renders it on a surface of the cylindrical display of the conferencing device. Rendering application 128, or some other application/hardware, may perform processing (e.g. adjusting for display type, animation, effects, lighting, and the like) on the incoming video signals before they are displayed. For example, the incoming video signals may be processed such that the video signals do not appear to be distorted on a non-flat surface, such as a cylindrical display. In the current example, cylindrical display on conferencing device 104 shows the video feed F3 captured by device 122 of remote participant 123 and the video feed F2 from device 105 that captured remote participants 103. As illustrated in conferencing devices 104 and 105, the incoming video feeds from the remote locations are displayed on a cylindrical video display that also includes a camera system that also is used to capture video signals that are transmitted to remote locations.

Figure 2:
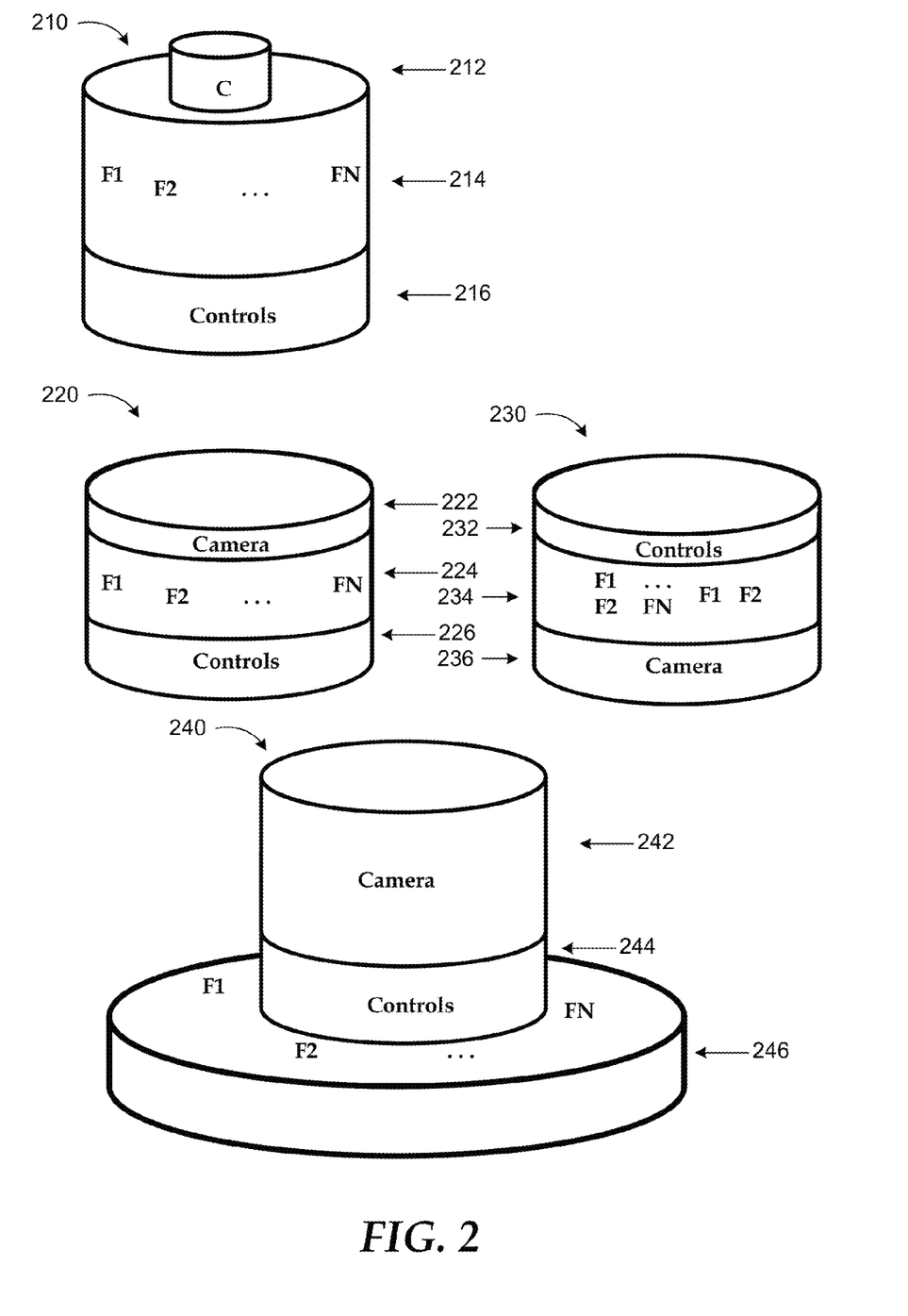
FIG. 2 shows exemplary video conferencing devices.

FIG. 2 shows exemplary video conferencing devices. As illustrated, FIG. 2 includes conferencing device 210, 220, 230 and 240. As described above, the conferencing device includes both a camera for capturing local participants and a display for displaying video feeds.

Conferencing device 210 shows a cylindrical conferencing device that comprises a camera 212, cylindrical display 214 and controls 216. The conferencing devices (210, 220, 230 and 240) are designed to sit on a tabletop in a conference room. Conferencing device 210 may be manufactured in different sizes. For example, conferencing device may be approximately (L×W×H) 15×15×15, 20×20×30, 12×12×20, and the like. Generally, the size of the conferencing device should not be so obtrusive to the participants such that they can not see each other in the conference room. Camera 212 may be any type of camera system that is designed to capture local participants of a video conference that may be situated around a conference table within a video conference room. For example, conventional pan/tilt/zoom cameras, 360-degree panorama cameras (e.g., which can pan/tilt/zoom digitally rather than mechanically), and the like may be used. One such 360-degree panorama camera system may use a camera pointed at a parabolic mirror device, and then use various calibration techniques to de-warp the image to normal images from which a 360-degree omni-directional image about the camera can be constructed. Another such 360-degree panorama camera system may use multiple cameras (each having a less-than-360-degree field-of-view) arranged so that together they provide an approximately 360-degree field-of-view.

As illustrated in conference device 210, camera 212 is mounted slightly above display 214. Display 214 is a cylindrical display. According to an embodiment, the cylindrical display is a smooth cylinder. The cylinder may also be designed in other ways. For example, an n-sided prism (e.g. 8, 10, 12, 14, 20 sides and the like) may be used to approximate the shape of a cylinder. Display 214 is configured to display video feeds (F1 to FN). The video feeds may be arranged in a variety of ways. For example, the feeds may be displayed completely around the cylindrical display, one after another, using only a portion of the display, in a pattern (e.g. 234), and the like. Generally, the feeds are displayed such that a local participant looks directly at the video conferencing device that also includes the camera. According to an embodiment, the video feeds are rotated around the cylindrical display programmatically such that a user eventually sees all 360 degrees of the display. Alternatively, the display may physically rotate automatically at a predetermined rate and/or be manually rotated. Controls 216 are provided to control the operation of conferencing device 210. The controls may comprise many different types of controls, such as phone controls (e.g. keypad, flash, on-hook, off-hook), speaker controls, camera controls, display controls, navigation keys and the like. Generally, controls 216 provide the controls that are provided by other video conferencing devices.

Conferencing device 220 shows a cylindrical conferencing device that comprises a camera 222, cylindrical display 224 and controls 226. Camera 222 is illustrated as part of display 224. For example, camera 222 may be mounted within/behind the display such that the camera and the display are at the approximately same level. The camera(s) 222 may also be integrated on the surface of the display 224. The camera may also be located slightly above the display (e.g. 1-6 inches) or slightly below the display (e.g. 1-6 inches). According to an embodiment, camera 222 is located at approximately eye level as the participants in the local conference room.

Conferencing device 230 shows a cylindrical conferencing device that comprises a camera 236, cylindrical display 234 and controls 232. Conferencing device 230 illustrates another arrangement for the camera and the controls. Conferencing device 230 also illustrates that the video feeds may be displayed in a variety of different ways. For example, a portion of the feeds may be arranged one way, and another portion in another configuration. The incoming video feeds can be displayed on the cylindrical display in multiple configurations and with options for animation (for example, the video feeds slowly rotate around the display, and/or the display changes in response to who is speaking).

Conferencing device 240 shows a cylindrical conferencing device that comprises a camera 242, circular display 246 and controls 244. Conferencing device 240 illustrates the display of video feeds F1-FN at the base of and on top of display 246. While display 246 is shown as being circular, the shape of display 246 may be other shapes. For example, display 246 may be a square, a rectangle, a triangle, a conical shape, and the like. Further, a center pedestal may be used to hold the camera portion and/or the display portion and/or the control portion. According to an embodiment, the positions of one or more of the different portions (e.g. camera, display, controls) are adjustable on the pedestal.

Figure 3:
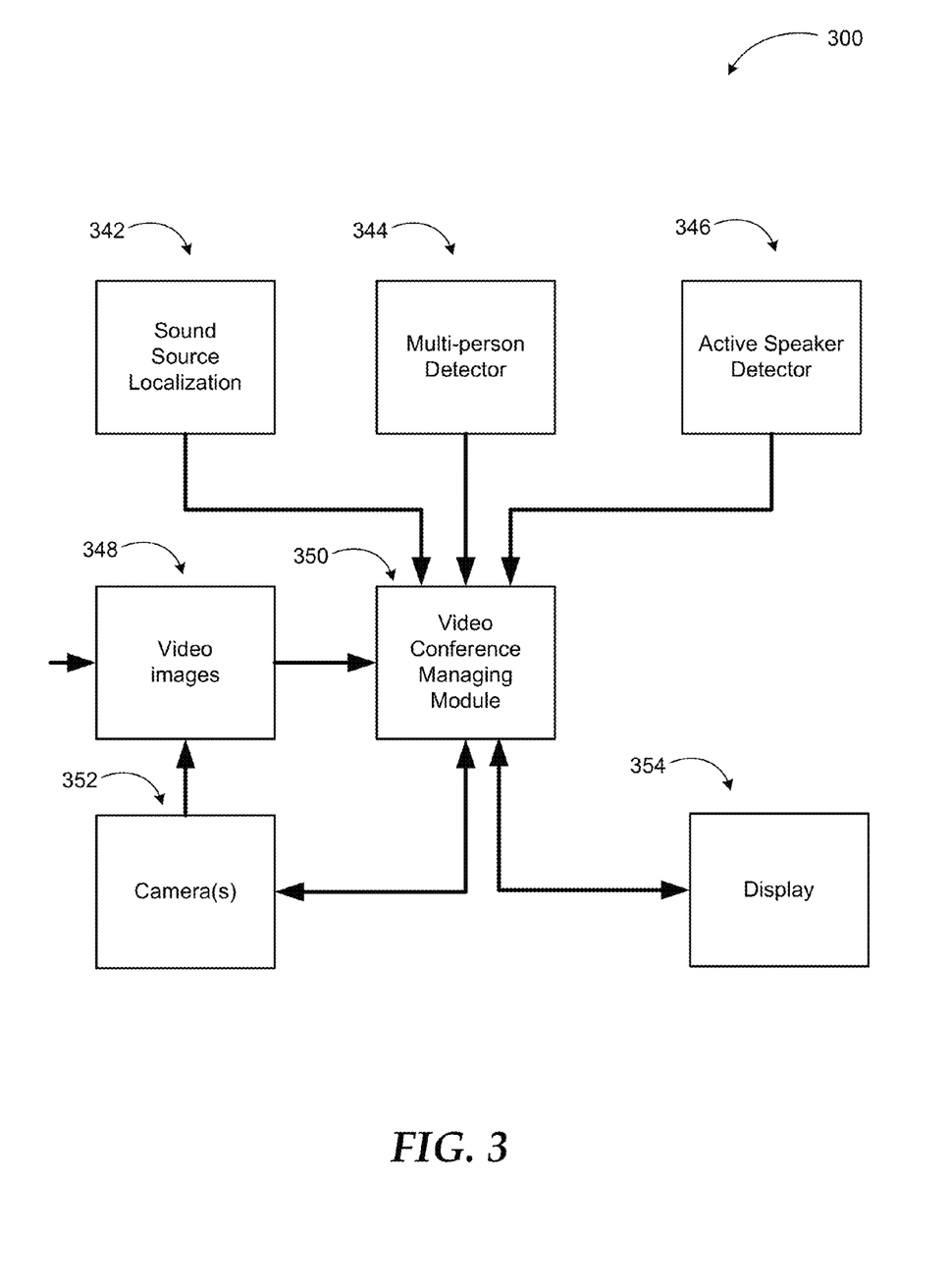
FIG. 3 illustrates a video conferencing system for capturing local participants and displaying incoming video feeds on a cylindrical display.

FIG. 3 illustrates a video conferencing system 300 for capturing local participants and displaying incoming video feeds on a cylindrical display.

In a video capture system, one or more cameras 352 capture video images of participants in a video conference. Cameras 352 are incorporated with a display 354 for showing a video signal, such as one or more incoming video feeds. A video conference managing module 350 may be used to manage the display and receipt/transmission of video images. For example, module 350 may be used to rotate/animate/select incoming video feeds around display 354. According to one embodiment, display 354 is a cylindrical display. The display may be configured in other ways. For example, display 354 may have a fixed number of sides. Module 350 may also be used to perform video processing on the incoming/outgoing video. For example, module 350 may be used to improve image quality such as enhancing a person or region of interest through adjustment of exposure and/or gain for that portion of the video frame. The sound source localization, multi-person, and active speaker detectors 342, 344, 346 use audio and/or visual cues to select a region of interest. Sound source localization detector 342 uses audio features such as sound detection from multiple microphones to detect the location of the speaker among multiple people. The multi-person detector 344 uses motion and image features (such as contours of a person, facial recognition, etc.) to determine the speaker. The active speaker detector 346 uses sound source localization, motion, and image features to detect the current speaker. Module 350 may determine to highlight a video display of an incoming feed on display 354 more often when the video feed shows the speaker. For example, the video feed of the speaker may be displayed larger on display 354 then the display of the other incoming feeds. The incoming video feeds may be shown one after another, layered, in a pattern, and the like, on display 354. According to one embodiment, the feeds to show on display 354 may be selected. Module 350 may be implemented as hardware, software, or a combination of the two.

Figure 4:
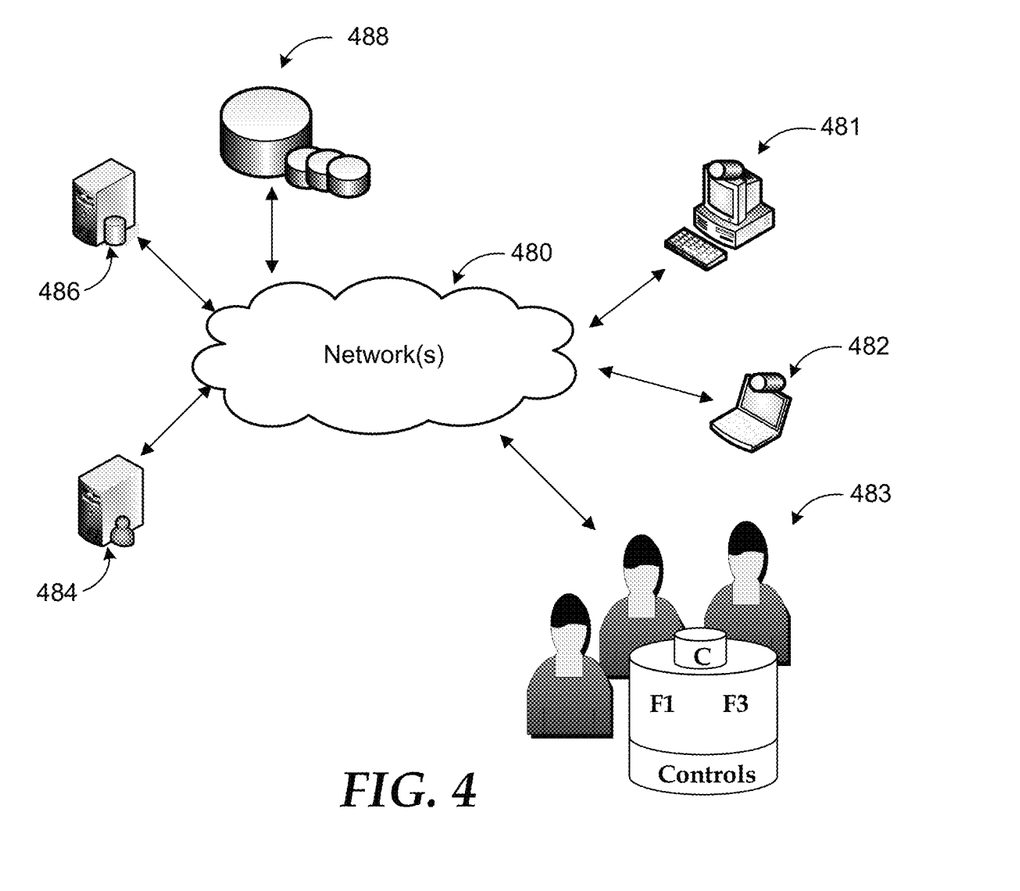
FIG. 4 shows a networked environment where embodiments may be implemented.

FIG. 4 shows a networked environment where embodiments may be implemented. One or more of the locations participating in the video conference may include a conferencing device as described above (e.g. 483).

Such a system may comprise any topology of servers, clients, Internet service providers, and communication media. Also, the system may have a static or dynamic topology. While a networked system implementing embodiments may involve many more components, relevant ones are discussed in conjunction with this figure.

Video conferencing applications may be executed and video rendered in devices 481-483. If the video application is part of a communication application (or service), the application or service may be managed by one or more servers (e.g. server 484). A portion or all of the generated video may be stored instead of being instantaneously rendered. In that scenario, the video files may be stored in a data store such as data stores 488 and provided to the video application(s) in devices subsequently through database server 486 or retrieved directly by the video application(s).

Network(s) 480 may include a secure network such as an enterprise network, an unsecure network such as a wireless open network, or the Internet. Network(s) 480 provide communication between the nodes described herein. By way of example, and not limitation, network(s) 480 may include wired media such as a wired network or direct-wired connection, and wireless media such as acoustic, RF, infrared and other wireless media.

Many other configurations of computing devices, applications, data sources, data distribution systems may be employed to implement a video conferencing system. Furthermore, the networked environments discussed in FIG. 4 are for illustration purposes only. Embodiments are not limited to the example applications, modules, or processes.

Figure 5:
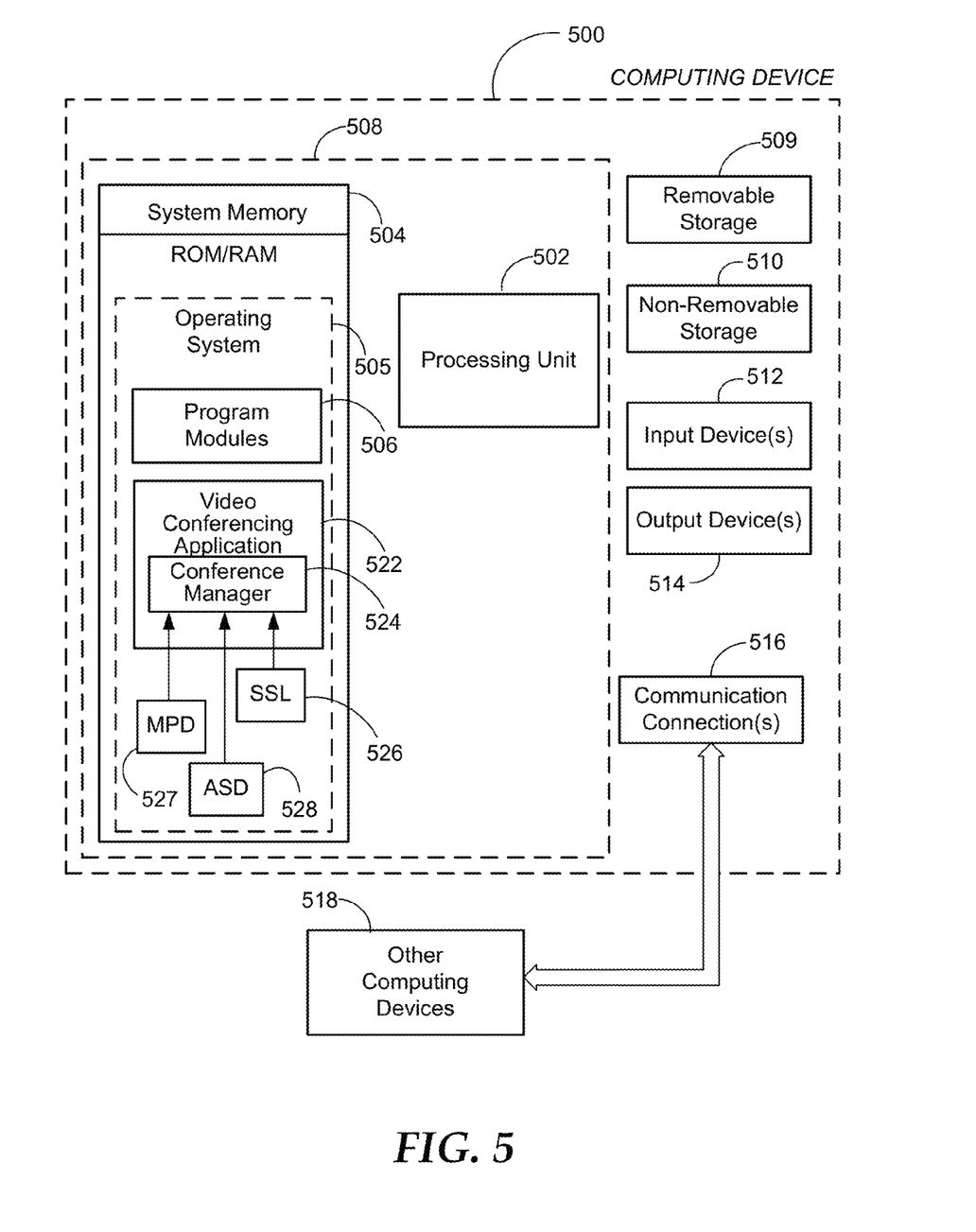
FIG. 5 illustrates an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment is illustrated, such as computing device 500. In a basic configuration, the computing device 500 may be a client device executing a video capture application and typically include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the computing device, such as the WINDOWS® operating systems from MICROSOFT CORPORATION of Redmond, Wash. The system memory 504 may also include one or more software applications such as program modules 506, video conferencing application 522, automatic exposure/gain control module 524, and at least one of sound source localization, multi-person detection, and active speaker detection modules (526-528).

Video conferencing application 522 may be a separate application or an integral module of a hosted service application that receives incoming video feeds from remote and local sources. Such as receiving video capture based on received video signals from a video conference camera system associated with computing device 500. Automatic exposure/gain control module 524 provides exposure and/or gain control services for improving video image quality based on input from one of the modules 526-528. This basic configuration is illustrated in FIG. 5 by those components within dashed line 508.

The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer storage media may include volatile and non-volatile, removable and non-removable media implemented in any method or technology for storage of information, such as computer readable instructions, data structures, program modules, or other data. System memory 504, removable storage 509 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of device 500. Computing device 500 may also have input device(s) 512 such as keyboard, mouse, pen, voice input device, touch input device, etc. Output device(s) 514 such as a display, speakers, printer, etc. may also be included. These devices are well known in the art and need not be discussed at length here.

The computing device 500 may also contain communication connections 516 that allow the device to communicate with other computing devices 518, such as over a wireless network in a distributed computing environment, for example, an intranet or the Internet. Other computing devices 518 may include client devices or server(s) that execute applications associated with rendering video signals from video capture application 522 in computing device 500. Communication connection 516 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. While the presence of a modulated data signal may be transitory in nature, the signal is generated to cause changes in a receiving device, thereby creating physical and tangible changes (effects) during its reception by the receiving device. By way of example, and not limitation, communication media includes wired media such as a wired network or direct-wired connection, and wireless media such as acoustic, RF, infrared and other wireless media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. An apparatus for video conferencing, comprising:
a camera for capturing video frames of local participants in a video conference;
a cylindrical display for displaying video feeds received from different remote locations for the video conference on a surface of the cylindrical display such that each of the different video feeds that are each associated with at least one different remote participant and that are received from the different remote locations are displayed in sequential order on the cylindrical display, wherein the cylindrical display is physically coupled to the camera; and
controls that are configured to perform operations for video conferencing, wherein the controls are physically coupled to the camera and the cylindrical display.

2. The apparatus of claim 1, wherein the camera is mounted at approximately a same level on the cylindrical display of at least one of the displayed video feeds.

3. The apparatus of claim 1, wherein the cylindrical display is approximated by an n-sided prism.

4. The apparatus of claim 1, wherein the camera is a 360-deg panorama camera.

5. The apparatus of claim 1, wherein the cylindrical display is provided on a base of the video conferencing apparatus.

6. The apparatus of claim 1, wherein the camera is mounted behind a display surface of the cylindrical display.

7. The apparatus of claim 1, wherein the camera is mounted on the display surface of the cylindrical display.

8. The apparatus of claim 1, wherein the camera is integrated on the surface of the cylindrical display.

9. The apparatus of claim 1, further comprising a pedestal, wherein the camera and the cylindrical display are mounted on the pedestal.

10. The apparatus of claim 9, wherein a height of the camera and the cylindrical display are adjustable on the pedestal.

11. The apparatus of claim 1, wherein the video frames are shown as rotating around the cylindrical display.

12. A system for video conferencing, comprising:
a memory;
a cylindrical display having a display surface around a circumference of the cylindrical display;
a camera that is physically coupled to the cylindrical display and that is configured to capture frames of video;

a processor coupled to the memory and the camera, and configured to execute a video conferencing application, the video conferencing application performing steps comprising:
  receiving video frames from the camera;
  receiving incoming video feeds from external locations;
  displaying each of the incoming video feeds received from the different external locations sequentially on the cylindrical display; and
  encoding the video frames from the camera for subsequent transmission to a video conferencing device; and
a communication device configured to transmit the encoded frames to the video conferencing device over a network.

13. The system of claim 12, wherein displaying the incoming video feeds on the cylindrical display comprises processing the incoming video feeds to be displayed on the cylindrical display and determining an active speaker and distinguishing a display of the active speaker from the other incoming video feeds on the cylindrical display.

14. The system of claim 12, wherein displaying the incoming video feeds on the cylindrical display comprises animating a display of the incoming video feeds.

15. The system of claim 14, wherein animating the display of the incoming video feeds comprises rotating the display of the incoming video feeds around the cylindrical display.

16. The system of claim 12, wherein the camera is mounted at approximately a same level the circular display.

17. A method for interacting with a video conferencing device that includes a cylindrical display and a camera, comprising:
  receiving video frames from the camera;
  receiving incoming video feeds from one or more external locations;
  displaying each of the incoming video feeds received from the one or more external locations one after another on the cylindrical display of the video conferencing device;
  encoding the video frames from the camera that is physically coupled to the cylindrical display for subsequent transmission to another video conferencing device; and
  transmitting the encoded frames to the another video conferencing device over a network.

18. The method of claim 17, wherein displaying the incoming video feeds on the cylindrical display comprises determining an active speaker and distinguishing a display of the active speaker from the other incoming video feeds on the cylindrical display.

19. The method of claim 17, wherein displaying the incoming video feeds on the cylindrical display comprises animating a display of the incoming video feeds.

20. The method of claim 19, wherein animating the display of the incoming video feeds comprises at least one of: rotating the display of the incoming video feeds around the cylindrical display; tiling the incoming video feeds; expanding one of the incoming video feeds having an active speaker; and duplicating one of the incoming video feeds.

* * * * *